000

United States Patent
Adamson

(10) Patent No.: US 9,244,816 B2
(45) Date of Patent: *Jan. 26, 2016

(54) APPLICATION TESTING USING SANDBOXES

(71) Applicant: Alcatel Lucent, Boulogne Billancourt (FR)

(72) Inventor: Kevin S. Adamson, Buckinghamshire (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/450,992

(22) Filed: Aug. 4, 2014

(65) Prior Publication Data
US 2014/0344786 A1    Nov. 20, 2014

Related U.S. Application Data

(63) Continuation of application No. 13/167,834, filed on Jun. 24, 2011, now Pat. No. 8,799,862.

(51) Int. Cl.
G06F 9/44 (2006.01)
G06F 11/36 (2006.01)
H04L 29/08 (2006.01)
G06F 9/455 (2006.01)

(52) U.S. Cl.
CPC ............ G06F 11/3664 (2013.01); H04L 67/14 (2013.01); *G06F 9/455* (2013.01)

(58) Field of Classification Search
CPC .................................................. G06F 11/3664
USPC ................. 717/102–109, 124–135, 174–178; 709/203–206, 217–245
See application file for complete search history.

(56) References Cited

U.S. PATENT DOCUMENTS

| | | | | |
|---|---|---|---|---|
| 5,651,111 | A * | 7/1997 | McKeeman et al. | 714/38.1 |
| 6,473,794 | B1 * | 10/2002 | Guheen et al. | 709/223 |
| 7,685,593 | B2 | 3/2010 | Solomon et al. | |
| 7,941,813 | B1 | 5/2011 | Protassov et al. | |
| 8,533,531 | B2 * | 9/2013 | El Mahdy et al. | 714/28 |
| 8,737,980 | B2 * | 5/2014 | Doshi et al. | 455/418 |

(Continued)

OTHER PUBLICATIONS

Watanabe, T.; Zixue Cheng; Kansen, M.; Hisada, M., "A New Security Testing Method for Detecting Flash Vulnerabilities by Generating Test Patterns," Network-Based Information Systems (NBiS), 2010 13th International Conference on, pp. 469,474, Sep. 14-16, 2010.*

(Continued)

*Primary Examiner* — Satish Rampuria
(74) *Attorney, Agent, or Firm* — Kramer & Amado, P.C.

(57) ABSTRACT

Various exemplary embodiments relate to a method and related network node including one or more of the following: determining, by the session establishment node, that a session should be established for the developer; transmitting, to a sandbox server, an instruction to establish a sandbox for the session; transmitting to the sandbox server, an identification of an emulator associated with the session; and notifying the developer when the sandbox is available for use. Various exemplary embodiments relate to a method and related network node including one or more of the following: receiving, by the sandbox server, an instruction to establish a sandbox; establishing the sandbox on the sandbox server; and instantiating a device emulator on the sandbox.

19 Claims, 6 Drawing Sheets

(56) References Cited

U.S. PATENT DOCUMENTS

| | | | |
|---|---|---|---|
| 2003/0208748 A1 | 11/2003 | Levin et al. | |
| 2006/0199165 A1* | 9/2006 | Crowhurst et al. | 434/350 |
| 2008/0234999 A1* | 9/2008 | Cohen et al. | 703/26 |
| 2009/0259993 A1* | 10/2009 | Konduri et al. | 717/127 |
| 2012/0180029 A1* | 7/2012 | Hill et al. | 717/135 |
| 2012/0300649 A1* | 11/2012 | Parmar et al. | 370/252 |

OTHER PUBLICATIONS

Yoshioka, K.; Hosobuchi, Y.; Orii, T.; Matsumoto, T., "Vulnerability in Public Malware Sandbox Analysis Systems," Applications and the Internet (SAINT), 2010 10th IEEE/IPSJ International Symposium on, pp. 265,268, Jul. 19-23, 2010.*

Zhen Li; Jun-Feng Tian; Feng-Xian Wang, "Sandbox System Based on Role and Virtualization," Information Engineering and Electronic Commerce, 2009. IEEC '09. International Symposium on, pp. 342,346, May 16-17, 2009.*

Cloud Computing, Wikipedia, 2014, 1-23.

Gama, et al., "A self-healing component sandbox for untrustworthy third party code execution", Springer-Verlag Berlin Heidelberg, 2010, 130-149.

Ronny Mandal, "Towards Safe Mutation Testing in a Sandbox Environment", University of OSLO Department of Informatics, May 2, 2011, pp. 1-85.

Stephen A. Ridley, "Escaping the Sandbox", SyScan-EuSecWest-ReCon, Jul. 15, 2010, pp. 1-85.

* cited by examiner

| Time Slot | Session ID | User ID | Emulator IDs | Tool IDs |
|---|---|---|---|---|
| 11:00 AM - 12:00 PM | 0x4EF1 | 0x12D102 | {0xDD} | {0x3; 0x4; 0x8; 0xF} |
| | 0x82D5 | 0x764E54 | {0xFE; 0xDD; 0x10} | {0x3} |
| | 0x7145 | 0x455BA7 | {0x1A} | {0xA; 0xB; 0xF} |
| | 0xA35E | 0xEFF410 | {0x56; 0x03} | {0x6; 0x9} |
| 12:00 PM - 1:00 PM | 0x723D | 0x12D102 | {0xFE} | {0x3; 0x4; 0x8; 0xF} |
| ... | ... | ... | ... | ... |

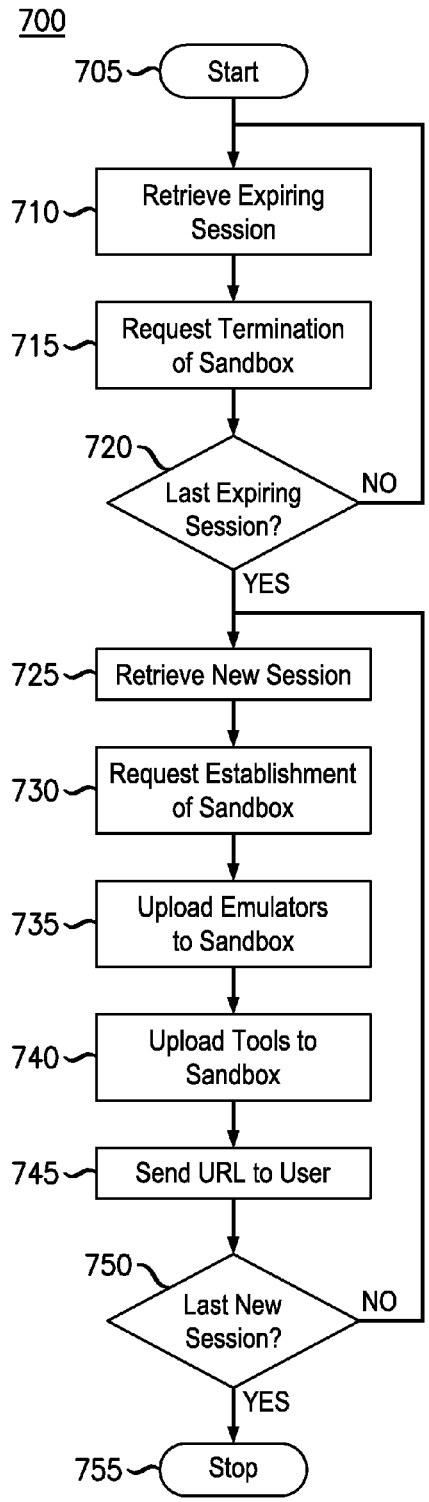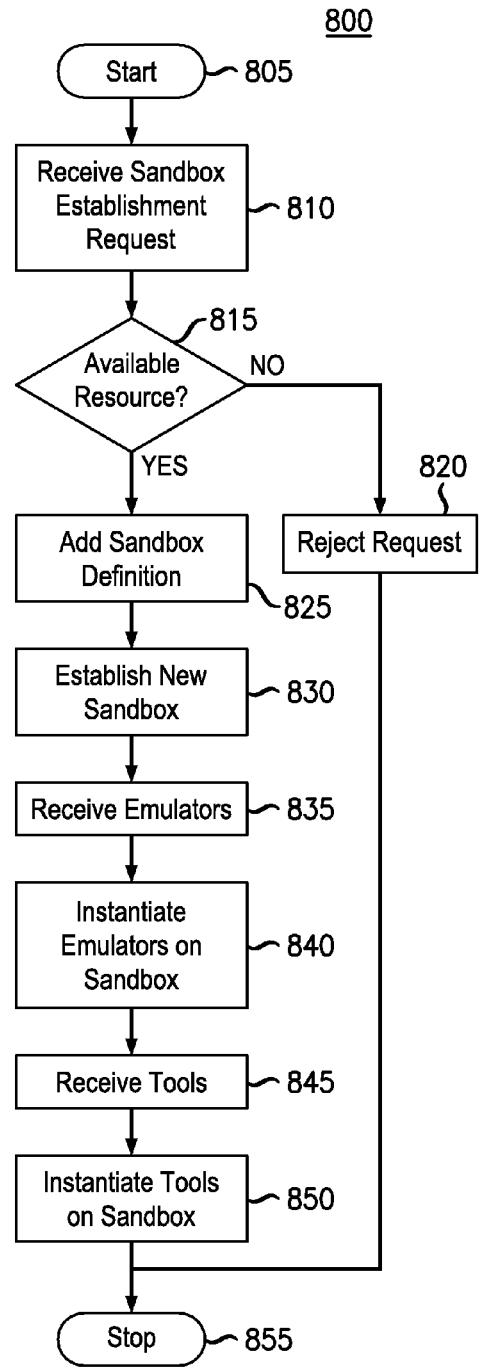
FIG. 7
FIG. 8

APPLICATION TESTING USING SANDBOXES

CROSS-REFERENCE TO RELATED APPLICATIONS

This application claims priority as a continuation to issued U.S. Pat. No. 8,799,862, corresponding to U.S. patent application Ser. No. 13/167,834, filed on Jun. 24, 2011, the entire disclosure of which is hereby incorporated herein by reference for all purposes.

TECHNICAL FIELD

Various exemplary embodiments disclosed herein relate generally to application development.

BACKGROUND

As a result of the widespread adoption of smart-phones, the number of different platforms available for execution of applications has exploded. In addition to the relatively few operating systems available for other devices such as personal computers, application developers must now consider a number of new mobile operating systems (such as Windows™ Mobile™, Google™ Android™ Apple™ iPhone™, and Nokia™ Symbian™ operating systems) in order to ensure broad operability. Adding to this dilemma, equipment and service providers often add to or otherwise alter open operating systems such as Google™ Android™, thereby requiring application developers to take numerous versions of the same operating system into account when testing an application.

In many cases, the only way to ensure that an application will operate correctly on these various devices is to test the application on each such device or using an associated software development kit (SDK). This process, however, is time consuming and requires the developer to obtain the devices or SDKs to be evaluated before testing and debugging may commence.

SUMMARY

Various exemplary embodiments relate to a method performed by a session establishment node for providing a sandbox to a developer, the method including one or more of the following: determining, by the session establishment node, that a session should be established for the developer; transmitting, to a sandbox server, an instruction to establish a sandbox for the session; transmitting to the sandbox server, an identification of an emulator associated with the session; and notifying the developer when the sandbox is available for use.

Various embodiments are described wherein the step of transmitting to the sandbox server, an identification of an emulator associated with the session comprises transmitting the device emulator to the sandbox server.

Various embodiments additionally include one or more of the following: transmitting a second device emulator to the sandbox server, wherein the device emulator and the second device emulator emulate different types of devices; and transmitting a test tool associated with the session to the sandbox server.

Various embodiments are described wherein the step of determining that a session should be established for the developer includes one or more of the following: receiving, by the session establishment node from the developer, a request for a session; scheduling the establishment of the session in association with a time slot; and determining, based on a current time and the time slot, that the session should be established for the developer.

Various embodiments are described wherein the sandbox server is associated with a cloud computing architecture, wherein the step of notifying the developer that the sandbox is available for use includes transmitting a uniform resource locator (URL) for accessing the sandbox, and/or wherein the session establishment node and the cloud server are different physical devices.

Various exemplary embodiments relate to a method performed by a sandbox server for providing a sandbox to a developer, the method including one or more of the following: receiving, by the sandbox server, an instruction to establish a sandbox; establishing the sandbox on the sandbox server; and instantiating a device emulator on the sandbox.

Various alternative embodiments additionally include one or more of the following: instantiating a second device emulator on the sandbox, wherein the device emulator and the second device emulator emulate different types of devices; instantiating a test tool on the sandbox; receiving application code from the developer; configuring the device emulator to run the application code; managing the distribution of processing resources among a plurality of sandboxes; and providing a user interface to the developer, wherein the user interface enables the developer to: transmit commands to the device emulator, and transmit commands to at least one test tool.

Various embodiments are described wherein the step of establishing the sandbox includes reserving cloud resources for use by the developer.

Various exemplary embodiments relate to a method performed by a developer device for testing an application, the method including one or more of the following: transmitting, to a session establishment node, a request for a sandbox; receiving a notification that the developer device may access the sandbox at a sandbox server; and transmitting, to the sandbox server, a request to access the sandbox.

Various embodiments are described wherein the session establishment node and the sandbox server are different physical devices, wherein the request for a sandbox includes an indication of at least one requested device emulator and at least one requested testing tool, and/or wherein the step of transmitting a request to access the sandbox includes accessing a web user interface.

Various alternative embodiments additionally include transmitting application code to the sandbox server.

BRIEF DESCRIPTION OF THE DRAWINGS

In order to better understand various exemplary embodiments, reference is made to the accompanying drawings, wherein:

FIG. 7 illustrates an exemplary method for managing scheduled sessions;

FIG. 8 illustrates an exemplary method for establishing a sandbox; and

To facilitate understanding, identical reference numerals have been used to designate elements having substantially the same or similar structure and/or substantially the same or similar function.

DETAILED DESCRIPTION

Figure 1:
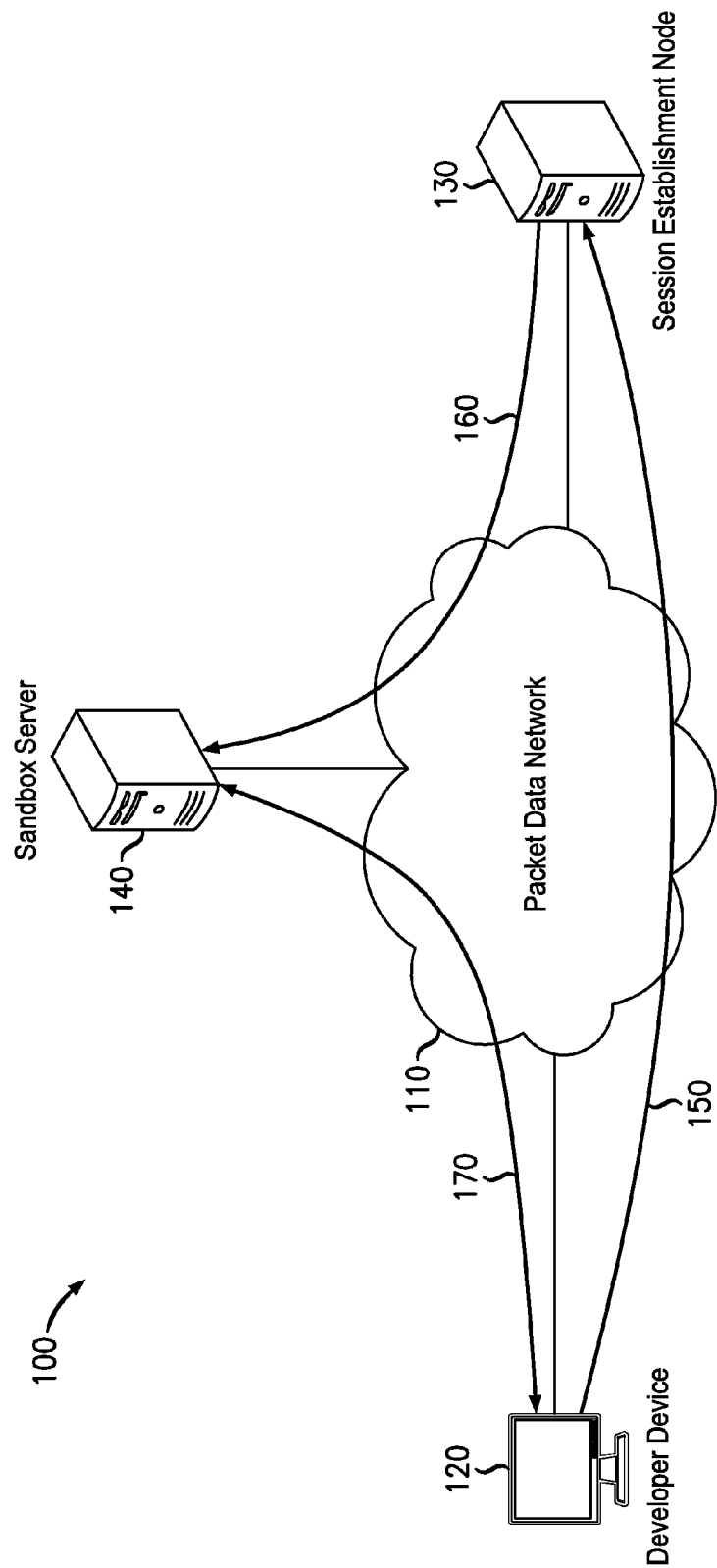
FIG. 1 illustrates an exemplary network for developing and testing applications.

In view of the foregoing, it would be desirable to provide a method for testing an application on multiple types of devices from a single interface using an aggregated tool set. It would further be desirable to perform such testing in a hosted environment. Accordingly, various embodiments enable an all-in-one testing environment to be established for a developer on a hosted sandbox. As used herein, the term "sandbox" will be understood to refer to a testing environment having dedicated resources for use in testing code.

Referring now to the drawings, there are disclosed broad aspects of various exemplary embodiments.

FIG. 1 illustrates an exemplary network 100 for developing and testing applications. Exemplary network may include a packet data network 110 as well as a number of devices attached to packet data network, such as developer device 120, session establishment node 130, and sandbox server 140.

Packet data network may be a device or group of devices adapted to provide communication between devices such as developer device 120, session establishment node 130, and sandbox server 140. Accordingly, packet data network may include a number of routers and/or switches for forwarding packets of to appropriate destinations. In various embodiments, packet data network is the Internet.

Developer device 120 may be any device used by a developer to communicate with session establishment node 130 and/or sandbox server 140. Accordingly, developer device may be a personal or laptop computer, server, tablet, wireless email device, cell phone, smart phone, television set-top box, or any other device capable of communicating with other devices via packet data network 130. Developer device 120 may additionally include software for enabling various forms of communication such as a web browser and/or email software.

Session establishment node 130 may be any device adapted to establish sandbox sessions at sandbox server 140 on behalf of developers. Accordingly, session establishment node 130 may be a personal or laptop computer, server, tablet, wireless email device, cell phone, smart phone, television set-top box, or any other device capable of receiving and fulfilling requests for sandbox sessions. In various embodiments, session establishment node 130 may be adapted to receive a request for a session from developer device 120 and subsequently instruct sandbox server 140 to establish a sandbox session. Session establishment node 130 may perform additional functions such as session scheduling, installation of device emulators on sandbox server 140, and/or installation of test tools on sandbox server 140. The detailed operation of session establishment node 130 will be described in greater detail, below.

Sandbox server 140 may be any device or group of devices for providing one or more sandboxes for various developers to use in testing applications. Accordingly, sandbox server may include a personal or laptop computer, server, tablet, wireless email device, cell phone, smart phone, television set-top box, and/or any other device capable of supporting and providing access to one or more sandbox. In various embodiments, upon instruction by session establishment node 130, sandbox server 140 may establish a new sandbox. Sandbox server may further instantiate various device emulators and testing tools within the sandbox, as will be described in further detail below. Sandbox server 140 may also provide developer device 120 with access to one or more such sandboxes. Such access may include installation of code on device emulators, other manipulation of device emulators, and/or utilization of testing tools.

In various embodiments, sandbox server may be or may otherwise include cloud-computing resources for supporting various sandboxes. Accordingly, sandbox server 140 may be a cloud-computing system such as, for example, Amazon Elastic Compute Cloud (EC2). The detailed operation of sandbox server 140 will be described in greater detail, below.

Note that in various embodiments, session establishment node 130 and sandbox server 140 may be located on the same premises. In such embodiments, session establishment node 130 and sandbox server 140 may communicate in a more direct manner that does not utilize packet data 110. In various embodiments, session establishment node 130 and sandbox server 140 may be the same device that performs both sets of functions.

Having described the components of exemplary network 100, a brief summary of the operation of network 100 will be provided. It should be apparent that the following description is intended to provide an overview of the operation of network 100 and is therefore a simplification in some respects. The detailed operation of network 100 will be described in further detail below in connection with FIGS. 2-9.

According to various exemplary embodiments, developer device 120 transmits a request message 150 to session establishment node 130. In various embodiments, request message 150 may be a hypertext transfer protocol secure (HTTPS) message. This request message may indicate that a developer would like to use a sandbox from 2:00-3:00 PM and that the sandbox should have an emulator of an HTC Evo mobile phone and a bandwidth performance testing tool. In response, session establishment node 130 schedules the requested session for the 2:00-3:00 PM time slot. Subsequently, when the current time is approximately 2:00 PM, session establishment node 130 may send an instruction 160 to sandbox server 140 to establish a sandbox for the developer. Session establishment node 130 may also send the requested emulator and tool to sandbox server 140. Upon receiving the emulator and tool, sandbox server instantiates the two objects on the newly established sandbox. Thereafter, developer device 120 may communicate 170 with sandbox server 140 for access to the sandbox. For example, developer device 120 may upload application code, which sandbox server may install on the emulator and subsequently use the testing tool to evaluate the bandwidth performance of the HTC Evo emulator while running the uploaded application.

Figure 2:
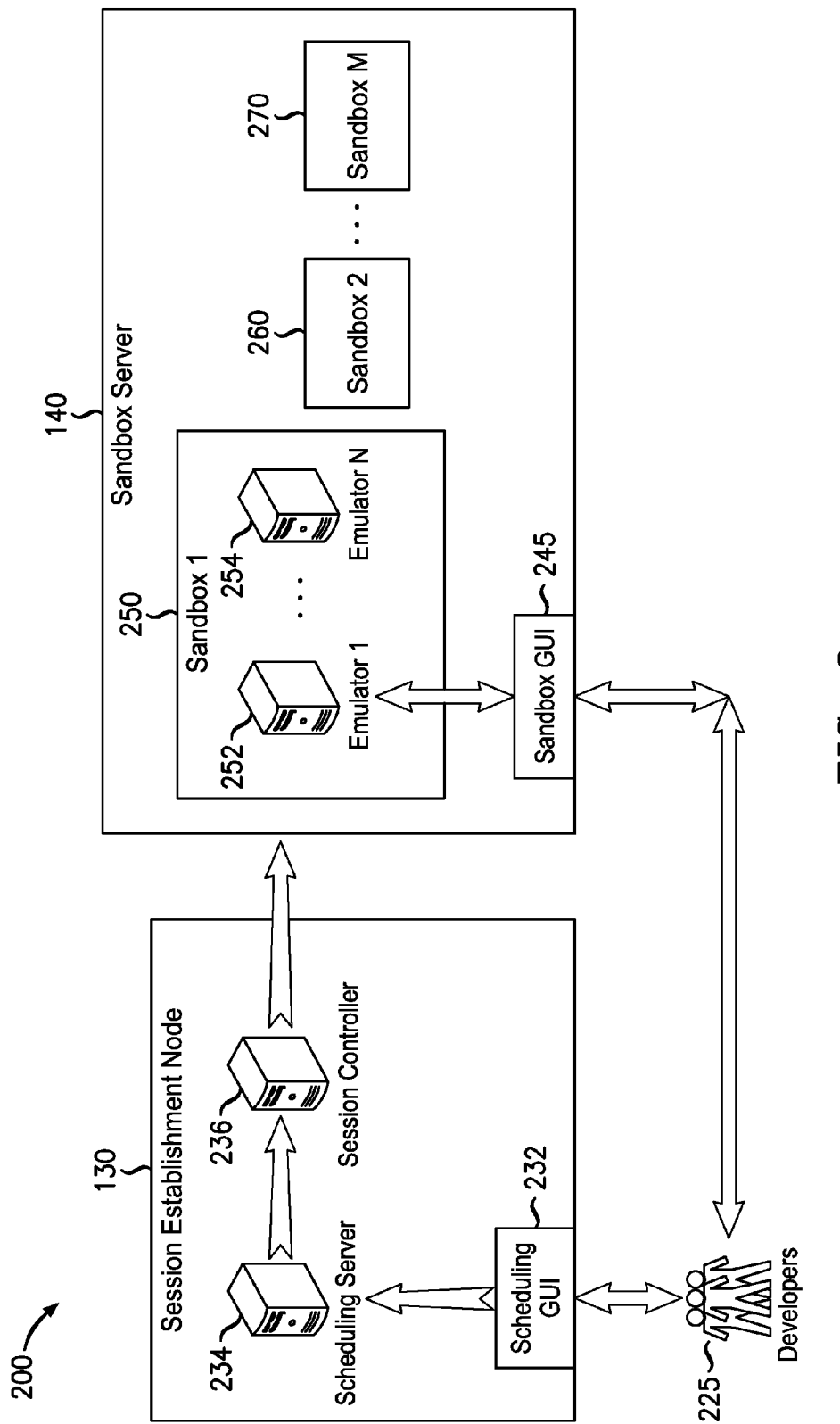
FIG. 2 illustrates a function-level diagram of an exemplary system for testing applications.

FIG. 2 illustrates a function-level diagram of an exemplary system 200 for testing applications. Exemplary system 200 may include three entities: developers 225, session establishment node 130, and sandbox server 140. As previously noted, in various alternative embodiments, the entities illustrated in system 200 may be collocated or may be the same physical device. For example, session establishment node 130 and sandbox server 140 may be the same device.

Developers 225 may include one or more application developers. Developers 225 may access the other entities using one or more developer devices such as developer device 120. Developers 225 may create application software for use on various devices, either locally or in connection with an API provided by session establishment node 130 or some other third party node (not shown).

Session establishment node 130 may include a scheduling graphical user interface (GUI) 232, scheduling server 234, and session controller 236, each of which may include hardware and/or executable instructions stored on a machine-readable medium. In various embodiments, scheduling GUI 232, scheduling server 234, and/or session controller 236 may share components. For example, session establishment node 130 may include a microprocessor that executes instructions associated with each of scheduling GUI 232, scheduling server 234, and/or session controller 236. Accordingly, this microprocessor may be included in each of these components.

When developers 225 wish to request the use of a sandbox, they may access scheduling GUI 232. In various exemplary embodiments, scheduling GUI 232 may be a web page and developers 225 may access scheduling GUI 232 via the World Wide Web. Scheduling GUI 232 may present developers 225 with a list of currently scheduled sessions and/or a list of currently available time slots for sessions. Using this information, developers 225 may request a particular time slot for establishment of a sandbox session. Scheduling GUI 232 may pass this request to scheduling server 234, which may store the scheduled session information for later use. In various alternative embodiments, developers 225 may not be given an opportunity to request a specific time and, instead, an available time slot may be assigned to the request by scheduling server 234.

In various embodiments, scheduling GUI 232 may present a number of additional options for a scheduled session. For example, scheduling GUI 232 may present a list of available device emulators and/or testing tools. Developers 225 may select one or more of such emulators and/or tools for use during the requested session. Accordingly, scheduling GUI 232 may pass this information to scheduling server 234, which may store this additional information for later use.

Scheduling GUI 232, or some other component of session establishment node 130, may additionally notify developers 225 of how to access the requested sandbox. For example, upon scheduling a session, scheduling GUI 232 may display the scheduled time slot and a URL for accessing the sandbox upon establishment. Alternatively, this information may be sent to developers 225 in an email or short message service (SMS) message. Further, this information may be conveyed immediately upon scheduling the session, at a predetermined time period prior to session establishment, or after actual establishment of the session.

Scheduling server 234 may be responsible for maintaining a session schedule and notifying session controller 236 when sessions should be established and terminated. Scheduling server 234 may maintain a schedule of various sessions for different time slots, as described above in connection with scheduling GUI 232. Periodically, scheduling server 234 may assess this schedule in light of the current time to determine whether any sessions are expiring. For each expiring session, scheduling server may indicate to session controller 236 that the particular session should be torn down and associated temporary data should be cleaned up such that the system resources are ready for reassignment.

Scheduling server 234 may additionally determine periodically, based on the schedule and current time, whether any scheduled sessions should be established. If so, scheduling server may instruct session controller 236 to establish a new session. Scheduling server 234 may further indicate to session controller any options, such as emulators and/or tools, that are to be included in the session.

Session controller 236 may be responsible for communicating with sandbox server 140 to terminate, establish, and configure sandboxes. Accordingly, session controller 236 may include an application programming interface for controlling sandbox server. Upon receiving an instruction from scheduling server 234 to terminate a session, session controller may identify one or more sandboxes associated with the session and transmit a command to sandbox server 140 to terminate those sandboxes. Likewise, upon receiving an instruction from scheduling server 234 to establish a new session, scheduling server may determine various establishment parameters such as, for example, an amount of memory or share of processing power, for at least one new sandbox and transmit an instruction to sandbox server 140 to establish the new sandboxes according the establishment parameters. In various embodiments, session controller 236 or sandbox server 140 may send a notification to developers at this time to indicate that the session has been established.

In various exemplary embodiments wherein scheduling server 234 further indicates one or more tools or emulators to be associated with a session, session controller 236 may locate any sets of machine-executable instructions defining or otherwise associated with the identified tools and/or emulators. Session controller 236 may then transmit the located machine-executable instructions to sandbox server 140 for instantiation in the new sandbox.

Sandbox server 140 may support multiple sandboxes 250, 260, 270 for use by various developers 225. Each sandbox may be uniquely associated with one or more portions of memory in sandbox server 140 so as to isolate any code executing within one sandbox from all other code on the system. Further, code within such portions of memory may be prevented from accessing any other portions of memory not associated with the sandbox. These sandboxes 250, 260, 270 may also share processing time on one or more processors of sandbox server 140. For example, each sandbox may receive an equal share of processing time in a round robin manner. Alternatively, sandboxes 250, 260, 270 may each be configured to receive a different share of processing time. For example, sandbox 1 250 may receive twice as much processing time as the other sandboxes 260, 270. Various additional methods of dividing the total processing resources available between sandboxes 250, 260, 270 will be apparent to those of skill in the art.

Sandboxes 250, 260, 270 may also include one or more device emulators. As an example, sandbox 1 250 includes device emulators 252, 254. Device emulators 252, 254 may each emulate a particular device. For example, Emulator 1 252 may emulate an HTC Evo mobile phone, while emulator N 254 may emulate an Apple iPhone. Accordingly, such emulators may include an operating system and/or code designed to simulate various hardware features of those devices. Various methods for implementing such features will be apparent to those of skill in the art.

Likewise, each sandbox 250, 260, 270 may similarly include one or more testing tools (not shown). Such testing tools may include machine-executable instructions adapted to perform various tests and simulate various conditions. For example, testing tools may be defined to monitor bandwidth performance, processing latency, network load, and/or to execute user-defined test scripts. Various other tools useful for testing application code will be apparent to those of skill in the art.

Sandbox server 140 may additionally include a sandbox GUI 245 for providing an interface between developers 225 and sandboxes 250, 260, 270. In various exemplary embodiments, sandbox GUI 245 may be a web page and developers 225 may access sandbox GUI 245 via the World Wide Web. For each developer 225 that accesses sandbox GUI 245, sandbox GUI 245 may identify a sandbox 250, 260, 270 associated with the developer 225 and provide access to that sandbox 250, 260, 270. For example, sandbox GUI 245 may receive a session or sandbox identifier in the requested URL or input by developer 225 in a webpage requesting such identifier. After identifying the appropriate sandbox 250, 260, 270, sandbox GUI 245 may present developers 225 with access to the emulators and tools running on that sandbox. Sandbox GUI 245 may further allow developers to upload and install application code on various emulators within the sandbox.

Figure 3:
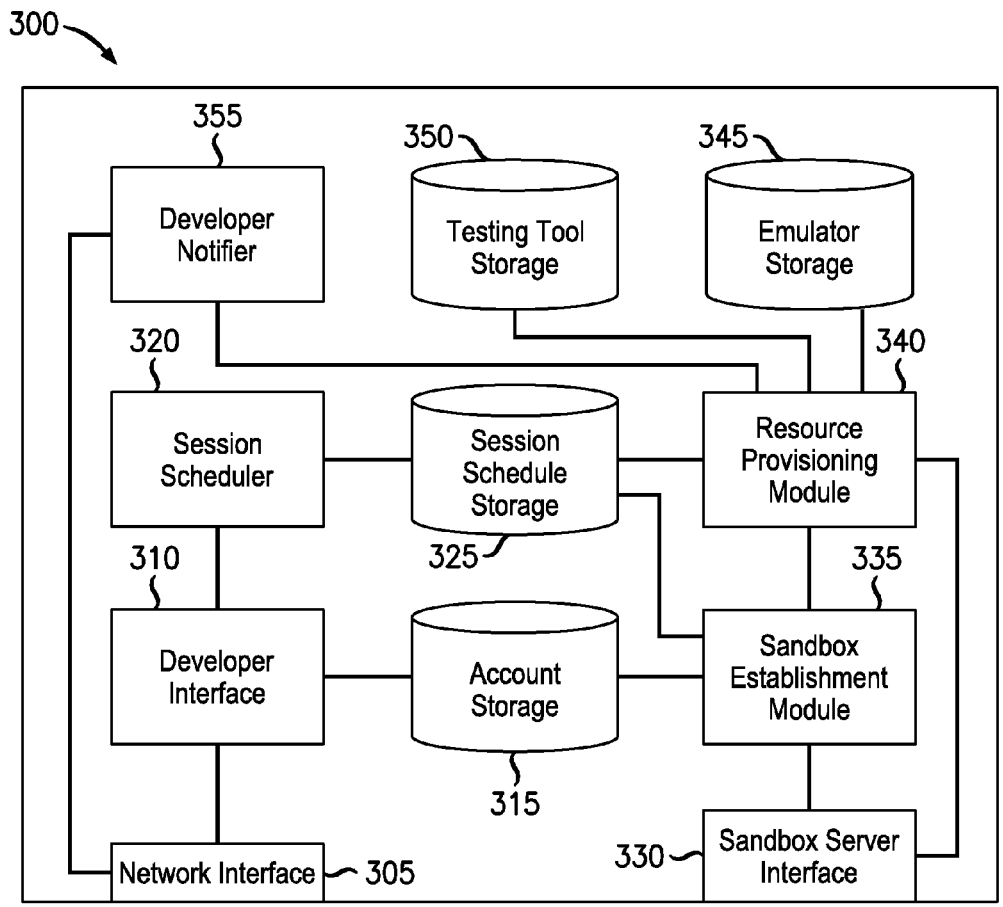
FIG. 3 illustrates an exemplary session establishment node.

FIG. 3 illustrates an exemplary session establishment node 300. Session establishment node 300 may correspond to session establishment node 130 and/or sandbox server 140 of FIGS. 1-2, or various portions thereof. Session establishment node 300 may include network interface 305, developer interface 310, account storage 315, session scheduler 320, session schedule storage 325, sandbox server interface 330, sandbox establishment module 335, resource provisioning module 340, emulator storage 345, testing tool storage 350, and developer notifier 355.

Network interface 305 may be an interface comprising hardware and/or executable instructions encoded on a machine-readable storage medium configured to communicate with at least one other network node. For example, network interface 305 may communicate with various developer devices such as developer device 120. Accordingly, network interface 305 may include one or more Ethernet interfaces for communication via a packet data network such as the Internet.

Developer interface 310 may include hardware and/or executable instructions on a machine-readable storage medium configured to provide a user interface to developers for requesting test sessions. In various embodiments, developer interface 310 may include a web server and one or more web pages. Developer interface 310 may first require that a developer provide authentication credentials prior to scheduling a session. For example, in various embodiments, developers may be required to maintain an account and/or pay a subscription fee for use of sandboxes and/or other service provided by session establishment node 300 or related devices. Upon receiving credentials, such as a user name and password, developer may read the records stored in account storage 315 to determine whether the credentials match a known account and/or whether the account is entitled to schedule a new session. In various embodiments, an account may not be entitled to schedule a new session if the account subscription does not include that service, if the maximum number of sessions for a particular time period has been previously reached, or if the maximum number of concurrent sessions for the account has been met for a particular time slot.

Developer interface 310 may be configured to display a schedule of sessions and/or open time slots. Using this display, an authenticated developer may be able to select a time slot for the requested session. The developer may also be able to select various emulators and tools to be included in the session, as previously described.

Account storage 315 may be any machine-readable medium capable of storing data related to developer accounts. Accordingly, account storage 315 may include a machine-readable storage medium such as read-only memory (ROM), random-access memory (RAM), magnetic disk storage media, optical storage media, flash-memory devices, and/or similar storage media. Account storage 315 may store a number of account records including various information such as user names, passwords, maximum numbers of sandboxes, email addresses, associated parent accounts, etc.

Session scheduler 320 may include hardware and/or executable instructions on a machine-readable storage medium configured to report scheduled sessions and open time slots to developer interface 310 for the purpose of conveying this information to developers. Session scheduler 320 may further be configured to receive and process requested session information. For example, upon receiving data defining a requested session from developer interface 310, session scheduler 320 may read session schedule storage 325 to determine whether the request may be fulfilled. For example, if there is no available slot for the requested time, session scheduler 320 may return an error to developer interface 310. If the session can be scheduled, session scheduler may create a new record represented the requested session and store the record in session schedule storage 325 for future use.

Session schedule storage 325 may be any machine-readable medium capable of storing data related to scheduled sessions. Accordingly, session schedule storage 325 may include a machine-readable storage medium such as read-only memory (ROM), random-access memory (RAM), magnetic disk storage media, optical storage media, flash-memory devices, and/or similar storage media. In various embodiments, session schedule storage 325 may be the same component as account storage 315. Session schedule storage 325 may store a number of scheduled session records defining sessions to be established in the future. An exemplary data arrangement for storing such records will be described in greater detail below with respect to FIG. 5.

Sandbox server interface 330 may be an interface comprising hardware and/or executable instructions encoded on a machine-readable storage medium configured to communicate with at least one sandbox server such as sandbox server 140. In various embodiments, sandbox server interface 330 may communicate with sandbox servers via a packet data network such as a local area network (LAN), wide area network (WAN), or the Internet. Accordingly, sandbox server interface 330 may include one or more Ethernet interfaces. In various embodiments, sandbox server interface 330 may be the same component as network interface 305.

Sandbox establishment module 335 may include hardware and/or executable instructions on a machine-readable storage medium configured to communicate via sandbox server interface 330 to establish sandboxes as appropriate. In various embodiments, sandbox establishment module 335 may periodically evaluate the data stored in session schedule storage 325 to determine whether any new sandboxes should be established. For example, sandbox establishment module 335 may compare a current time to various time slots to determine whether a particular session should be activated. Upon determining that a session should be activated, sandbox establishment module 335 may transmit an instruction via sandbox server interface 330 to establish a new sandbox. Sandbox establishment module 335 may also transmit information related to one or more accounts that will access the sandbox such as, for example, authentication information stored in account storage 315. Sandbox establishment module 335 may then wait to receive a confirmation message via sandbox server interface 330, indicating whether the sandbox was successfully established. Once the session is established, sandbox establishment module may then indicate to resource provisioning module 340 that the sandbox may now be configured.

Resource provisioning module 340 may include hardware and/or executable instructions on a machine-readable storage medium configured to further configure an established sandbox based on various options requested by a developer. For example, using the scheduled session record, resource provisioning module 340 may identify one or more emulators and/or testing tools. Subsequently, resource provisioning module may locate code defining any requested emulators or tools in emulator storage 345 or testing tool storage 350, respectively. Resource provisioning module 340 may then transmit such code via sandbox server interface 330 for instantiation within the newly established sandbox. In various alternative embodiments, the code defining various emulators and/or tools may be stored elsewhere such as, for example, on a sandbox server. Accordingly, resource provisioning module 340 or sandbox establishment module 335 may simply transmit an identifier for the requested emulators or tools.

Emulator storage 345 may be any machine-readable medium capable of storing code defining various device emulators. Accordingly, emulator storage 345 may include a machine-readable storage medium such as read-only memory (ROM), random-access memory (RAM), magnetic disk storage media, optical storage media, flash-memory devices, and/or similar storage media. In various embodiments, emulator storage 345 may be the same component as account storage 315 and/or session schedule storage 325. Emulator storage 345 may store code defining device emulators in association with respective unique emulator identifiers.

Testing tool storage 350 may be any machine-readable medium capable of storing code defining various testing tools. Accordingly, testing tool storage 350 may include a machine-readable storage medium such as read-only memory (ROM), random-access memory (RAM), magnetic disk storage media, optical storage media, flash-memory devices, and/or similar storage media. In various embodiments, testing tool storage 350 may be the same component as account storage 315, session schedule storage 325, and/or emulator storage 345. Emulator storage 345 may store code defining testing tools in association with respective unique tool identifiers.

Developer notifier 355 may include hardware and/or executable instructions on a machine-readable storage medium configured to transmit a notification to a developer when a sandbox is ready for use. Accordingly, upon receiving an indication from sandbox establishment module 335 or resource provisioning module 340 that a sandbox has been established and/or configured, developer notifier may transmit a notification, such as an email or SMS message, to the developer. Alternatively, developer notifier 355 may monitor session schedule storage 325 and transmit such an indication a predetermined time prior to establishment of the sandbox. For example, developer notifier 255 may send a reminder email to a developer fifteen minutes before the developer's scheduled time slot opens. Whenever developer notifier 355 transmits such an indication, developer notifier 355 may also include an indication of how to access the sandbox. For example, developer notifier 355 may include a unique sandbox identifier and/or a unique URL for accessing the particular sandbox. Using this information, a developer may access the scheduled sandbox at an appropriate time.

Figure 4:
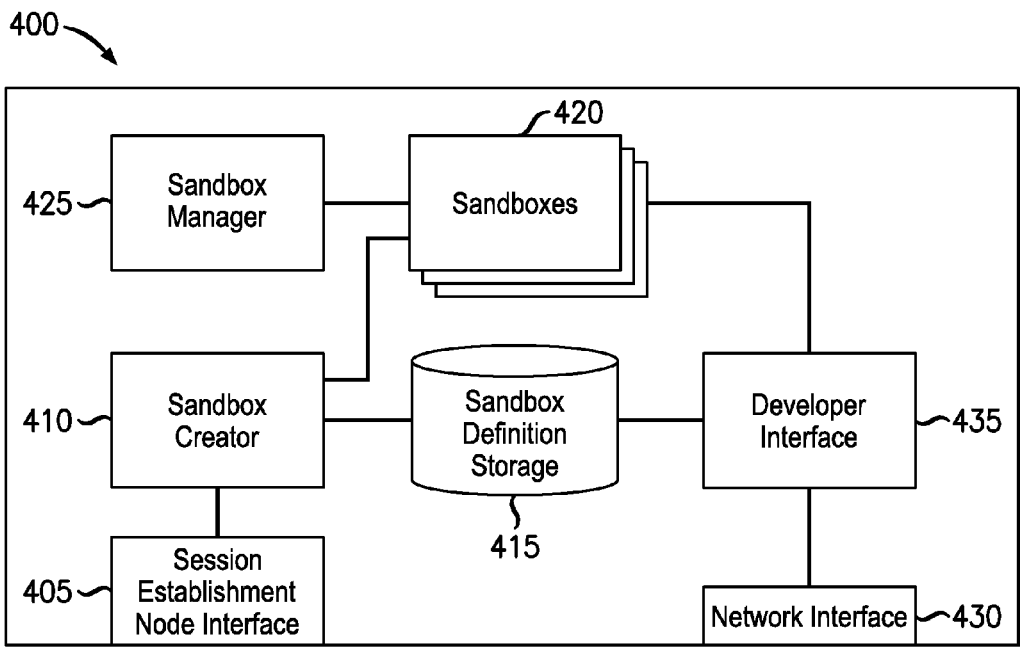
FIG. 4 illustrates an exemplary sandbox server.

FIG. 4 illustrates an exemplary sandbox server 400. Sandbox server 400 may correspond to session establishment node 130 and/or sandbox server 140 of FIGS. 1-2, or various portions thereof. Sandbox server 400 may include session establishment node interface 405, sandbox creator 410, sandbox definition storage 415, sandboxes 420, sandbox manager 425, network interface 430, and developer interface 435.

Session establishment node interface 405 may be an interface comprising hardware and/or executable instructions encoded on a machine-readable storage medium configured to communicate with at least one session establishment node such as session establishment node 130. In various embodiments, session establishment node interface 405 may communicate with sandbox servers via a packet data network such as the LAN, WAN, or the Internet. Accordingly, session establishment node interface 405 may include one or more Ethernet interfaces.

Sandbox creator 410 may include hardware and/or executable instructions on a machine-readable storage medium configured to receive instructions to create sandboxes via session establishment node interface 504 and to subsequently create such requested sandboxes. In particular, upon receiving a request for a sandbox, sandbox creator 410 may update sandbox definition storage 415 to include a record defining the new sandbox. This record may include information such as a session identifier, emulator identifiers, tool identifiers, and/or developer authentication information. Sandbox creator 410 may further reserve various system resources to create the new sandbox 420. For example, sandbox creator 410 may reserve a portion of memory and/or cloud resources to support the new sandbox 420.

Sandbox definition storage 415 may be any machine-readable medium capable of storing code defining various device emulators. Accordingly, sandbox definition storage 415 may include a machine-readable storage medium such as read-only memory (ROM), random-access memory (RAM), magnetic disk storage media, optical storage media, flash-memory devices, and/or similar storage media. Sandbox definition storage 415 may store records for tracking the sandboxes 420 established on sandbox server 400.

Sandboxes 420 may include hardware and/or executable instructions on a machine-readable storage medium configured to provide isolated environments for testing application code. Accordingly, sandboxes 420 may each constitute an isolated portion of memory and may each be provided with a share of processor cycles available in the system. In various embodiments, sandboxes 420 may be resident in or otherwise supported by cloud resources. Sandboxes may further each include device emulators and/or testing tools.

Sandbox manager 425 may include hardware and/or executable instructions on a machine-readable storage medium configured to ensure proper operation of sandboxes 420. For example, sandbox manager 425 may deny any request to access memory outside of the requesting sandbox. Sandbox manager 425 may further be responsible for ensuring proper distribution of processor cycles. For example, sandbox manager 425 may implement a round robin or other scheduling algorithm for determining which sandbox 420 should be given access to an available processor.

Network interface 430 may be an interface comprising hardware and/or executable instructions encoded on a machine-readable storage medium configured to communicate with at least one other network node. For example, network interface 430 may communicate with various developer devices such as developer device 120. Accordingly, network interface 430 may include one or more Ethernet interfaces for communication via a packet data network such as the Internet. In various embodiments, network interface 430 may be the same component as session establishment node interface 405.

Developer interface 435 may include hardware and/or executable instructions on a machine-readable storage medium configured to provide an interface for developers to communicate with sandboxes 420. In various embodiments, developer interface 310 may include a web server and one or more web pages. Upon receiving an access request, developer interface may identify the requested sandbox 420. For example, developer interface may attempt to match the requested URL or a portion thereof with a sandbox definition in sandbox definition storage 415. Developer interface 310 may require that a developer provide authentication credentials prior to accessing the sandbox. Again, developer interface 435 may validate this credential information against data in the associated sandbox definition.

Once the developer has been properly authenticated, developer interface 435 may provide access to the appropriate sandbox 420. In various embodiments, developer interface 435 may allow a developer to upload application code and subsequently install such code on any device emulators instantiated in the sandbox. Developer interface 435 may further allow a developer to manipulate device emulators. For example, developer interface 435 may display a "screen" of the device emulator and allow the developer to "push" buttons and navigate the device menus. Developer interface 435 may also provide access to any instantiated tools within the sandbox 420. Various additional features of developer interface 435 for facilitating application testing will be apparent to those of skill in the art.

Figures 5, 6:
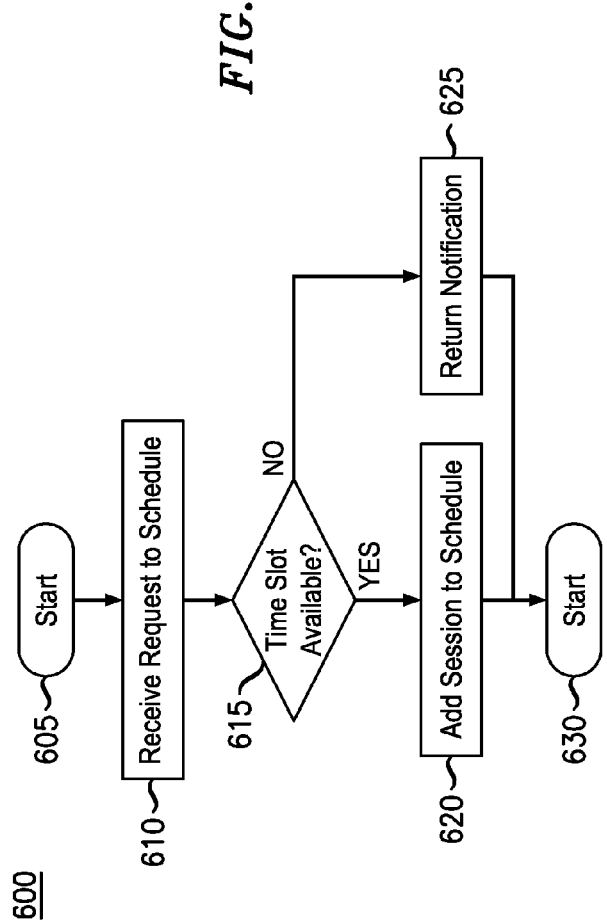
FIG. 5 illustrates an exemplary data arrangement for storing a session schedule.
FIG. 6 illustrates an exemplary method for scheduling a session.

FIG. 5 illustrates an exemplary data arrangement 500 for storing a session schedule. Data arrangement 500 may be a table in a database or cache such as session schedule storage 325. Alternatively, data arrangement 500 may be a series of linked lists, an array, or a similar data structure. Thus, it should be apparent that data arrangement 500 is an abstraction of the underlying data; any data structure suitable for storage of this data may be used. Data structure 500 may include numerous fields such as time slot field 505, session ID field 510, user ID field 515, emulator IDs field 520. Data arrangement may include additional fields (not shown) for storing additional information such as, for example, a sandbox processor priority and/or an amount of memory to reserve.

Time slot field 505 may store an indication of a time period associated with each session. In the illustrated example, each time slot is one hour long. However, various embodiments may alternatively or additionally support other time periods such as, for example, 30 minute or 45 minute periods. Session ID field 510 may store an identifier for the requested session. Such identifier may be used to identify a session and/or sandbox among various components of a sandbox testing system. User identifier 515 may be a unique identifier indicating a developer that requested and/or will use a particular session. Emulator IDs field 520 may store a set of identifiers specifying various device emulators to be instantiated for a particular session. Likewise, tool IDs field 525 may store a set of identifiers specifying various testing tools to be instantiated for a particular session.

As an example, data arrangement 500 illustrates a number of time slots. Time slot 530 is applicable between 11:00 AM and 12:00 PM and is associated with scheduled sessions 532, 534, and 536. Time slot 540 is applicable between 12:00 PM and 1:00 PM and is associated with scheduled sessions 542, 544. Data arrangement 500 may include numerous additional time slots and scheduled sessions 550.

Exemplary scheduled session 532 has a session ID 0x4EF1 and was requested by user 0x12D102. This session should include an emulator identified as 0xDD and testing tools identified as 0x3, 0x4, 0x8, and 0xF. As another example, scheduled session 534 is scheduled for the same time slot and has a session ID 0x82D5. This exemplary session was requested by user 0x764E54 to include one tool, identified as 0x3, and three device emulators, identified as 0xFE, 0xDD, and 0x10. It should be noted that, while both scheduled sessions 532 and 534 have requested the use of emulator 0xDD, these sessions, where possible may have access to two different instantiations of the device emulator identified as 0xDD Likewise, the sessions may also have access to two different instantiations of the testing tool identified as 0x3. Data arrangement 500 includes additional examples of scheduled sessions 536, 542, 544, the meanings of which will be apparent in view of the foregoing.

FIG. 6 illustrates an exemplary method 600 for scheduling a session. Method 600 may be performed by the components of session establishment node 300 such as, for example, developer interface 310 and/or session scheduler 320.

Method 600 may begin in step 605 and proceed to step 610, where session establishment node 300 receives a request to schedule a session. Such request may include a requested time slot, requested device emulators, requested testing tools, other desired parameters, etc. As previously described, the information included in a request may be specified and/or selected by a developer using a web page or other interface. For example, a developer may specify a requested time slot by selecting a time slot from a plurality of time slots presented via a web page as available for session scheduling. Session establishment node 300 may further authenticate the user before or after step 610, as described above. After receiving the request, method 605 may proceed to step 615, where session establishment node 300 may determine whether the requested time slot is available by, for example, comparing the number of sessions currently scheduled during any portion of the requested time slot to a maximum number of sessions allowable for the developer, for a group to which the developer belongs, and/or for all developers using the system. If the time slot is available, session establishment node 300 may add the requested session to a list of scheduled sessions in step 620 and proceed to end in step 620.

If, however, the requested time slot is not available, method 600 may instead proceed to step 625. In step 625, session establishment node 300 may return a notification such as an error message indicating that the requested session could not be scheduled. Session establishment node 300 may then allow the developer to request a session for a different time period. In various alternative embodiments, session establishment node 300 may instead select an alternative time slot for the session and either automatically schedule the session for that time slot or propose the alternative time slot to the developer in step 625. In various alternative embodiments, session establishment node may provide a develop to select an "ad-hoc" option when a time slot is immediately available. Upon selection of such an option, session management node may schedule the session for the current time slot or otherwise immediately establish the requested session. Method 600 may then proceed to end in step 625.

FIG. 7 illustrates an exemplary method 700 for managing scheduled sessions. Method 700 may be performed by the components of session establishment node 300 such as, for example, sandbox establishment module 335, resource provisioning module 340, and/or developer notifier 355. Method 700 may be executed periodically such as, for example, every hour, every fifteen minutes, or whenever at least one time slot begins and/or ends.

Method 700 may begin in step 705 and proceed to step 710 where session establishment node 300 retrieves an expiring session. For example, session establishment node 300 may refer to a session schedule to determine whether any time windows that were open during the last execution of method 700 are now closed. Session establishment node 300 may then retrieve a session associated with one such window. Session establishment node 300 may then send a message to a sandbox server requesting that any sandboxes associated with the session be terminated. Method 700 may then proceed to step 720 where session establishment node 300 may determine whether any additional expiring sessions should be processed. If the current session is not the last expiring session, method 700 may loop back to step 710. Otherwise, method 700 may proceed to step 725. In various alternative embodiments, a sandbox server may be configured to automatically terminate sandboxes without request by session establishment node 300. For example, each sandbox may expire after a predetermined time has elapsed or may be configured upon establishment with an expiration time. In such embodiments, method 700 may not include steps 710, 715, 720.

In step 725, session establishment node 300 may retrieve a new session to establish. For example, session establishment node 300 may refer to a session schedule to determine whether any time windows that were closed during the last execution of method 700 are now open. Upon retrieving such a session, method 700 may proceed to step 730 where session establishment node 300 may send a request message to a sandbox server for the establishment of at least one sandbox in connection with the session. Next, in step 735, session establishment node 300 may upload any device emulators requested for the session to the sandbox server. In various alternative embodiments, a sandbox server may already store code associated with one or more device emulators. In such embodiments, session establishment node 300 may simply send one or more device emulator identifiers to the sandbox server in step 735. Method 700 may then proceed to step 740, where session establishment node 300 may upload one or more testing tools to the sandbox server. In various alternative embodiments, a sandbox server may already store code associated with one or more testing tools. In such embodiments, session establishment node 300 may simply send one or more testing tool identifiers to the sandbox server in step 740.

Next, in step 745, session establishment node 300 may send a URL or other notification to a developer when the sandbox is ready. For example, session establishment node 300 may send such a message to the developer upon establishment upon transmission of the request for establishment of the session. As another example, session establishment node may transmit a notification at another time, indicating when the session will be established. Accordingly, step 745 may be performed at another time or in another method such as, for example, method 600.

Method 700 may then proceed to step 750, where session establishment node 300 may determine whether any additional sessions remain to be established. If the current session is not the last new session, method 700 may loop back to step 725. Otherwise, method 700 may proceed to end in step 755.

FIG. 8 illustrates an exemplary method 800 for establishing a sandbox. Method 800 may be performed by the components of sandbox server 400 such as, for example, sandbox creator 410 and/or sandboxes 420.

Method 800 may begin in step 805 and proceed to step 810, where sandbox server 400 may receive a request for the establishment of a sandbox. For example, sandbox server 400 may receive such a request from a session establishment entity. Then, in step 815, sandbox server 400 may determine whether sandbox server 400 has sufficient resources to establish the requested sandbox. For example, sandbox server 400 may compare an amount of memory requested or necessary for establishing the sandbox to an amount of free memory currently available. In various embodiments, sandbox server 400 may request additional resources from a cloud computing system. If there are not enough resources to fulfill the request, sandbox server 400 may reject the request and respond to the requesting device with an error message. Method 800 may then end in step 855.

If, on the other hand, sandbox server 400 determines that enough resources are available to fulfill the request, method 800 may proceed to step 825. In step 825, sandbox server 400 may add a new definition for the new sandbox to a list of sandbox definitions, as described in greater detail above. For example, the sandbox definition may include an indication of a developer to which the sandbox belongs and an area of memory where the sandbox will reside. Method 800 may then proceed to step 830, where sandbox server 400 may establish the new sandbox in the available system resources. Various methods for establishing a testing sandbox will be apparent to those of skill in the art. It should be noted that, in various embodiments, steps 825 and 830 may be performed in reverse order. For example, sandbox server 400 may add the sandbox definition after establishing the sandbox.

Next, in step 835, sandbox server 400 may receive device emulator code and/or identifiers for device emulators from a requesting device. Sandbox server 400 may then instantiate the received emulators within the new sandbox. For example, sandbox server 400 may install or otherwise store the corresponding device emulator code within the portion of memory allocated to the sandbox. Sandbox server 400 may also initiate a process for each such emulator for executing the associated code. Likewise, in step 845, sandbox server 400 may receive testing tool code and/or identifiers for testing tools from a requesting device. Then, in step 850, sandbox server 800 may instantiate the received tools within the sandbox. For example, sandbox server 400 may install or otherwise store the corresponding testing tool code within the portion of memory allocated to the sandbox. Sandbox server 400 may also initiate a process for each such tool for executing the associated code. Method 800 may then end in step 855.

Figure 9:
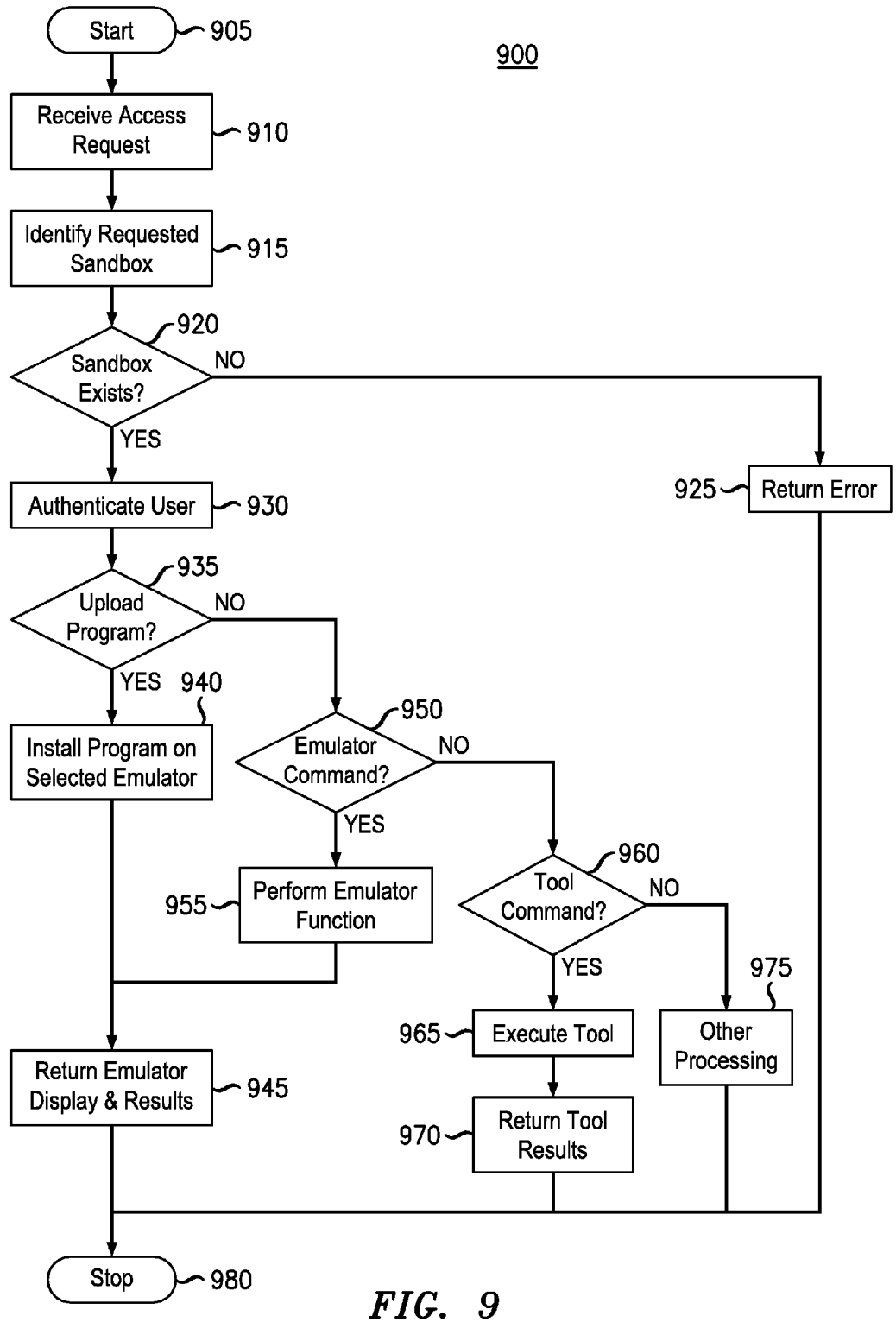
FIG. 9 illustrates an exemplary method for providing access to a sandbox.

FIG. 9 illustrates an exemplary method 900 for providing access to a sandbox. Method 900 may be performed by the components of sandbox server 400 such as, for example, sandboxes 420, sandbox manager 425, and/or developer interface 435.

Method 900 may begin in step 905 and proceed to step 910 where sandbox server 400 may receive an access request for a sandbox. Such request may be, for example, an http(s) request that identifies a particular sandbox and/or user. In step 915, sandbox server 400 may attempt to identify the requested sandbox by, for example, consulting a list of sandbox definitions. In step 920, sandbox server 400 may determine whether the identified sandbox exists. For example, sandbox server 400 may determine that the sandbox does not exist if sandbox server 400 could not identify any sandbox in step 915. If the sandbox does not exist, sandbox server 400 may simply return an error to the requesting device in step 925, and method 900 may proceed to end in step 980.

If, on the other hand, sandbox server 400 is able to identify an active sandbox, method 900 may proceed from step 920 to step 930. In step 930, sandbox server 400 may attempt to authenticate the user. For example, sandbox server 400 may compare a session identifier, user identifier, and/or password to data stored in the associated sandbox definition. If the compared data does not match the sandbox definition, method 900 may simply end. Otherwise, method 900 may proceed to step 935 where sandbox server 400 determines whether the access request is a request to upload application code to a device emulator. If so, sandbox server 400 may proceed to receive and install the application code on at least one emulator in the sandbox in step 940. Method 900 may then proceed to step 945.

If sandbox server 400 determines in step 935 that the request does not include application code for installation, method 900 may instead proceed to step 950, where sandbox server 400 may determine whether the access request includes a command for a device emulator. If so, method 900 may proceed to step 955, where sandbox server 400 may perform the specified command on the device emulator. For example, the access request may specify that a particular button should be "pressed" on the emulator or that a device should be "tilted" a specified direction. The sandbox server may emulate the requested command and method 900 may proceed to step 945.

In step 945, sandbox server 400 may return an emulator display and/or any other results of the command. In various embodiments, this may include returning an html or other web page displaying an emulated device screen. Such web page may be operable for transmitting further access requests to the sandbox server 400. Method 900 may then end in step 980.

In step 950, if the sandbox server 400 determines that the access request does not include an emulator command, method 900 may instead proceed to step 960, where sandbox server 400 may determine whether the access request includes a tools command. For example, the access request may request the execution and/or results from a testing tool. If the access request includes such a command, sandbox server 400 may execute the testing tool in step 965 and return tool results to the developer in step 970. In various embodiments, this may include returning an html or other web page displaying a testing tool report. Such web page may be operable for transmitting further access requests to the sandbox server 400. Method 900 may then end in step 980.

If, on the other hand, sandbox server 400 determines at step 960 that the access request does not include a tool command, method 900 may instead proceed to step 975. In step 975, sandbox server 400 may perform other processing in order to fulfill the access request. For example, such processing may include changing the parameters of a sandbox, terminating a sandbox, or saving the current state of a sandbox for future use. Various additional types of access request useful in testing applications will be apparent to those of skill in the art. Step 975 may also include presenting a web page to a developer that may be operable for transmitting further access requests to the sandbox server 400. Method 900 may then end in step 980.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a session establishment node for providing a sandbox to a developer, the method comprising:
   determining, by the session establishment node, that a session is to be established for the developer, by:
      receiving, by the session establishment node from the developer, a request for a session;
      scheduling the establishment of the session in association with a time slot; and
      based on a current time and the time slot, determining that the session is to be established for the developer;
   transmitting, to a sandbox server, an instruction to establish a sandbox for the session;
   transmitting to the sandbox server, an identification of an emulator associated with the session, among a plurality of available emulators; and
   notifying the developer of a time when the sandbox is available for use.

2. The method of claim 1, wherein the step of transmitting to the sandbox server, an identification of an emulator associated with the session comprises transmitting the device emulator to the sandbox server.

3. The method of claim 2, further comprising transmitting a second device emulator to the sandbox server, wherein the device emulator and the second device emulator emulate different types of devices.

4. The method of claim 1, further comprising transmitting a test tool associated with the session to the sandbox server.

5. The method of claim 1, wherein the sandbox server is associated with a cloud computing architecture.

6. The method of claim 1, wherein the step of notifying the developer that the sandbox is available for use includes transmitting a uniform resource locator (URL) for accessing the sandbox.

7. The method of claim 1, wherein the session establishment node and the cloud server are different physical devices.

8. A method performed by a sandbox server for providing a sandbox to a developer, the method comprising:
   receiving, by the sandbox server, an instruction to establish a sandbox after a session establishment node scheduled the establishment of a session in association with a time slot, and determined that the session is to be established for the developer by consideration of a current time and the time slot;
   establishing the sandbox on the sandbox server;
   instantiating a device emulator on the sandbox;
   receiving, by the sandbox server, an identification for the device emulator associated with a session established for the developer, among a plurality of available device emulators; and notifying the developer of a time when the sandbox is available for use.

9. The method of claim 8, further comprising instantiating a second device emulator on the sandbox, wherein the device emulator and the second device emulator emulate different types of devices.

10. The method of claim 8, further comprising instantiating a test tool on the sandbox.

11. The method of claim 8, wherein the step of establishing the sandbox comprises reserving cloud resources for use by the developer.

12. The method of claim 8, further comprising:
receiving application code from the developer; and
configuring the device emulator to run the application code.

13. The method of claim 8, further comprising managing the distribution of processing resources among a plurality of sandboxes.

14. The method of claim 8, further comprising providing a user interface to the developer, wherein the user interface enables the developer to:
transmit commands to the device emulator, and
transmit commands to at least one test tool.

15. A method performed by a developer device for testing an application, the method comprising:
transmitting, to a session establishment node, a request for a sandbox;
based on the session establishment node scheduling the establishment of the session in association with a time slot, and determining that the session is to be established for the developer by consideration of a current time and the time slot:
receiving a notification that the developer device is to access the sandbox at a sandbox server, the sandbox having been associated with an identification for a device emulator associated with a session established for the developer, among a plurality of available device emulators;
receiving notification of a time when the sandbox is available for use; and
transmitting, to the sandbox server, a request to access the sandbox.

16. The method of claim 15, wherein the session establishment node and the sandbox server are different physical devices.

17. The method of claim 15, wherein the request for a sandbox includes an indication of at least one requested device emulator and at least one requested testing tool.

18. The method of claim 15, further comprising transmitting application code to the sandbox server.

19. The method of claim 15, wherein the step of transmitting a request to access the sandbox comprises accessing a web user interface.

* * * * *